(12) United States Patent
Taira et al.

(10) Patent No.: US 6,581,397 B1
(45) Date of Patent: Jun. 24, 2003

(54) REFRIGERATING DEVICE (75) Inventors: Shigeharu Taira, Kusatsu (JP); Junichirou Tanaka, Kusatsu (JP); Koji Shibaike, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/110,930

(22) PCT Filed: Oct. 12, 2000

(86) PCT No.: PCT/JP00/07067

§ 371 (c)(1),
(2), (4) Date: Apr. 18, 2002

(87) PCT Pub. No.: WO01/29489

PCT Pub. Date: Apr. 26, 2001

(30) Foreign Application Priority Data

Oct. 18, 1999 (JP) ............................. 11-295258
Feb. 17, 2000 (JP) ........................ 2000-039467
Jul. 24, 2000 (JP) ........................ 2000-222450

(51) Int. Cl.$^7$ ............................. F25B 5/00; F25B 41/00
(52) U.S. Cl. ........................................ 62/199; 62/513
(58) Field of Search ...................... 62/199, 197, 513, 62/113, 114; 252/67, 69

(56) References Cited

U.S. PATENT DOCUMENTS

| | | | | |
|---|---|---|---|---|
| 5,626,026 A | * | 5/1997 | Sumida et al. | 62/129 |
| 5,647,224 A | * | 7/1997 | Kushiro et al. | 62/197 |
| 5,941,084 A | * | 8/1999 | Sumida et al. | 62/129 |
| 5,987,907 A | * | 11/1999 | Morimoto et al. | 62/212 |
| 6,003,323 A | * | 12/1999 | Sumida et al. | 62/175 |
| 6,105,386 A | * | 8/2000 | Kuroda et al. | 62/513 |
| 6,405,559 B1 | * | 6/2002 | Yoneda | 62/513 |

FOREIGN PATENT DOCUMENTS

| | | |
|---|---|---|
| JP | 6-265232 | 9/1994 |
| JP | 7-27431 A | 1/1995 |
| JP | 8-200866 A | 8/1996 |
| JP | 9-14767 A | 1/1997 |
| JP | 9-178273 A | 7/1997 |
| JP | 10-325622 A | 12/1998 |
| JP | 11-44461 | 2/1999 |
| JP | 2943613 B2 | 6/1999 |
| JP | 2951043 B2 | 7/1999 |
| JP | 11-173698 A | 7/1999 |
| WO | 97/24415 A1 | 7/1997 |

* cited by examiner

Primary Examiner—Denise L. Esquivel
Assistant Examiner—Marc Norman
(74) Attorney, Agent, or Firm—Birch, Stewart, Kolasch & Birch, LLP (57) ABSTRACT

A refrigerating device has a refrigerant circuit having a compressor (1), an indoor heat exchanger (3), a main motor operated valve (EV1), and an indoor heat exchanger (5) connected in a loop, and uses, as a working medium, an R32 refrigerant or a mixed refrigerant containing R32 at at least 70 wt %. A supercooling heat exchanger (11) is disposed between the indoor heat exchanger (3) and the main motor operated valve (EV1), and the liquid side of the refrigerant circuit are connected to the gas side by by-pass pipes (33, 34) through the supercooling heat exchanger (11). A supercooling motor operated valve (EV2) is disposed at the by-pass pipe (33) upstream of the supercooling heat exchanger (11). A discharge temperature detected by a discharge temperature sensor (21) is determined by a discharge temperature determination part (10 b), and based on the determination result, the opening of the supercooling motor operated valve (EV2) is controlled so as to control an amount of the refrigerant flowing through the by-pass pipes (33, 34), whereby, using the working medium containing R32, the discharge temperature of the compressor is optimized without reducing the efficiency, and the COP and reliability are improved.

13 Claims, 11 Drawing Sheets

RELIABILITY OF COMPRESSOR

| DRYNESS X (1 : GAS, 0 : LIQUID) | EVALUATION OF RELIABILITY | |
|---|---|---|
| | R32 | R22 |
| 0.95 | ◎ | ◎ |
| 0.90 | ◎ | ○~△ |
| 0.85 | ◎ | × |
| 0.80 | ◎ | × |
| 0.75 | ◎ | × |
| 0.70 | ○ | × |
| 0.65 | ○ | × |
| 0.60 | ○~△ | × |
| 0.55 | △ | × |
| 0.50 | × | × |

◎ : SUFFICIENTLY RELIABLE (HAVING MARGIN)
○ : SAME LEVEL AS CONVENTIONAL COMPRESSOR WITH R22
△ : A LITTLE INFERIOR
× : UNUSABLE

Fig.12

BALANCE STATE OF MACHINE

Fig.13

REFRIGERATING DEVICE

This application is the national phase under 35 U.S.C. § 371 of PCT International Application No. PCT/JP00/07067 which has an International filing date of Oct. 12, 2000, which designated the United States of America.

TECHNICAL FIELD

The present invention relates to a refrigerating device using a working medium containing an R32 refrigerant (chemical formula: $CH_2F_2$) and particularly to a refrigerating device which copes with a low GWP (global warming potential), is energy-saving and inexpensive, and is capable of protecting the ozone layer and achieving recycling.

BACKGROUND ART

Hitherto, a refrigerating device of the heat pump type using a HCFC (hydrochlorofluorocarbon) refrigerant is known. The refrigerating device has a refrigerant circuit having a compressor, a condenser, a motor operated valve, and an evaporator connected sequentially in the shape of a loop and has a supercooling heat exchanger disposed between the condenser and the motor operated valve. A gas refrigerant from the supercooling heat exchanger is returned to a liquid injection of the compressor and the suction side of the compressor. However the refrigerating device has a problem of deterioration of the COP (coefficient of performance) owing to decrease in the circulation amount of the refrigerant caused by by-passing of the refrigerant. The HCFC refrigerants have a problem of deteriorating the environment of the earth because they have a high ozone-layer destruction coefficient and a high GWP (global warming potential).

Thus it is conceivable to use the R32 refrigerant as a low-GWP HFC refrigerant capable of realizing a high COP without destroying the ozone layer. However in its physical properties, the R32 refrigerant has a higher discharge temperature than the HCFC refrigerants. Thus the R32 refrigerant has a problem that it deteriorates oil for the refrigerating device so that the reliability deteriorates.

In a conventional apparatus using R22, when a dryness of the refrigerant at the suction side of a high-pressure dome type compressor is 0.97, the discharge temperature reaches 90° C. In the case of a low-pressure dome type compressor, when a dryness of the refrigerant at its suction side is 0.97, the discharge temperature reaches 70° C.

The R32 refrigerant has a low pressure loss and its COP (coefficient of performance) can be improved, whereas in its physical properties, its discharge temperature rises to a temperature higher than the discharge temperatures of R22, R410, and R407 by 15° C. in theory and by 10–15° C. in actual measurement. Thus in an apparatus using R22, R410 or R407, merely replacing such a refrigerant with R32 and changing the refrigeration oil to an oil compatible with R32 would lead to a problem of deterioration in reliability and performance.

Regarding the reliability, there is a fear that when the compressor is heated to a high temperature, deterioration of a material and oil proceeds and its long-term reliability deteriorates. In particular, because a compressor motor deteriorates (the demagnetizing force decreases) greatly owing to temperature, attention should be paid to a DC motor in dependence on a material that is used therefor.

Regarding the performance, supposing that the discharge-pipe temperature, the manner of controlling the refrigerant by using sensors, and the manner of controlling electric current are same as before, the R32 refrigerant has a problem of deteriorating the performance of the refrigerating device and reducing its operation area.

DISCLOSURE OF THE INVENTION

Therefore, it is an object of the present invention to provide a refrigerating device capable of optimizing the discharge temperature of a compressor without deteriorating the efficiency of the compressor by using a working medium containing an R32 refrigerant, so that the COP and reliability of the refrigerating device is improved.

In order to accomplish the above object, a refrigerating device according to the present invention comprises:

a refrigerant circuit having a compressor, a condenser, a main pressure-reducing means, and an evaporator connected in a loop;

a supercooling heat exchanger disposed between the condenser and the main pressure-reducing means;

a by-pass pipe by which a gas side of the refrigerant circuit and a liquid side thereof are connected through the supercooling heat exchanger; and a supercooling pressure-reducing means disposed at the by-pass pipe upstream of the supercooling heat exchanger, wherein:

the refrigerating device uses an R32 refrigerant or a mixed refrigerant containing the R32 refrigerant at at least 70 wt %; and the refrigerating device further comprises:

a discharge temperature sensor detecting a discharge temperature of the compressor;

a discharge temperature determination part determining the discharge temperature detected by the discharge temperature sensor; and a control part controlling the supercooling pressure-reducing means, based on a result of determination made by the discharge temperature determination part, to control an amount of the refrigerant flowing through the by-pass pipe.

According to the refrigerating device, after the R32 refrigerant (or the mixed refrigerant containing R32 at at least 70 wt %) discharged from the compressor is condensed by the condenser, the refrigerant is pressure-reduced by the main pressure-reducing means. Then the refrigerant vaporizes in the evaporator and returns to the suction side of the compressor. At this time, the refrigerant pressure-reduced by the supercooling pressure-reducing means flow from the liquid side of the refrigerant circuit to the gas side thereof at the downstream side of the evaporator by the by-pass pipe through the supercooling heat exchanger. The supercooling heat exchanger supercools the refrigerant flowing from the condenser to the main pressure-reducing means. The discharge temperature determination part determines the discharge temperature detected by the discharge temperature sensor. Based on the result of the determination, the control parts controls the supercooling pressure-reducing means to adjust the amount of the refrigerant flowing through the by-pass pipes to a large amount or a small amount, according as the discharge temperature is high or low. Thus, when the discharge temperature is high, the discharge temperature can be decreased by increasing the amount of the refrigerant flowing through the by-pass pipes. Accordingly, even if the R32 refrigerant (or the mixed refrigerant containing R32 at at least 70 wt %) which is higher, due to its physical property, in the discharge temperature than the HCFC refrigerants is used, it is possible to optimize the discharge temperature without deteriorating the efficiency and thus improve the COP and the reliability. A motor operated valve may be used as the supercooling pressure-reducing means. Then, the opening of the motor operated valve is controlled to control a by-pass refrigerant amount. Further a solenoid operated valve and a capillary may be combined to provide the supercooling pressure-reducing means to control the by-pass refrigerant amount by opening and closing of the solenoid operated valve.

In one embodiment, when the discharge temperature determination part determines that the discharge temperature exceeds a set upper-limit value, the control part controls the supercooling pressure-reducing means to increase the amount of the refrigerant flowing through the by-pass pipe, and to decrease the amount of the refrigerant flowing through the by-pass pipe when the discharge temperature determination part determines that the discharge temperature is smaller than a set lower-limit value.

According to the refrigerating device, when the discharge temperature determination part determines that the discharge temperature exceeds a set upper-limit value, the control part controls the supercooling pressure-reducing means to increase the amount of the refrigerant flowing through the by-pass pipe. On the other hand, when the discharge temperature determination part determines that the discharge temperature is smaller than the set lower-limit value, the control part controls the supercooling pressure-reducing means to decrease the amount of the refrigerant flowing through the by-pass pipe. Thereby optimum control of the discharge temperature can be accomplished without deteriorating the efficiency.

In another embodiment, the supercooling pressure-reducing means comprises a supercooling motor operated valve, and the refrigerating device further comprises a condensation temperature sensor detecting a condensation temperature of the condenser; an evaporation temperature sensor detecting an evaporation temperature of the evaporator; and a target discharge temperature computing part computing a target discharge temperature, based on the condensation temperature detected by the condensation temperature sensor, the evaporation temperature detected by the evaporation temperature sensor, and an opening of the supercooling motor operated valve. The control part controls the main pressure-reducing means to allow the discharge temperature of the compressor to attain to the target discharge temperature.

According to the refrigerating device, based on the condensation temperature of the condenser detected by the condensation temperature sensor, the evaporation temperature of the evaporator detected by the evaporation temperature sensor, and the opening of the supercooling motor operated valve, the target discharge temperature computing part computes the target discharge temperature suitable to the operation conditions or situation (cooling operation/heating operation, operation frequency of the compressor, etc.). Based on the target discharge temperature computed by the target discharge temperature computing part, the control part controls the main pressure-reducing means to control the amount of the refrigerant flowing through the refrigerant circuit so that the discharge temperature of the compressor attains to the target discharge temperature. Thus, optimum control of the discharge temperature can be accomplished according to the amount of the refrigerant flowing through the by-pass pipe, namely, a supercooling degree.

In one embodiment, the refrigerating device further comprises an evaporator-exit temperature sensor detecting a temperature at an exit of the evaporator. The control part controls the main pressure-reducing means and the supercooling motor operated valve, based on the target discharge temperature computed by the target discharge temperature computing part and the temperature at the exit of the evaporator detected by the evaporator-exit temperature sensor.

According to the refrigerating device, the evaporator-exit temperature sensor detects the temperature at the exit of the evaporator. Based on the target discharge temperature computed by the target discharge temperature computing part and the temperature at the exit of the evaporator detected by the evaporator-exit temperature sensor, the control part controls the main pressure-reducing means and the supercooling pressure-reducing means. By using the temperature at the exit of the evaporator to control the discharge temperature of the compressor, it is possible to improve controllability of the amount of the refrigerant flowing through the by-pass pipe, namely, controllability of the supercooling degree.

Figure 12:
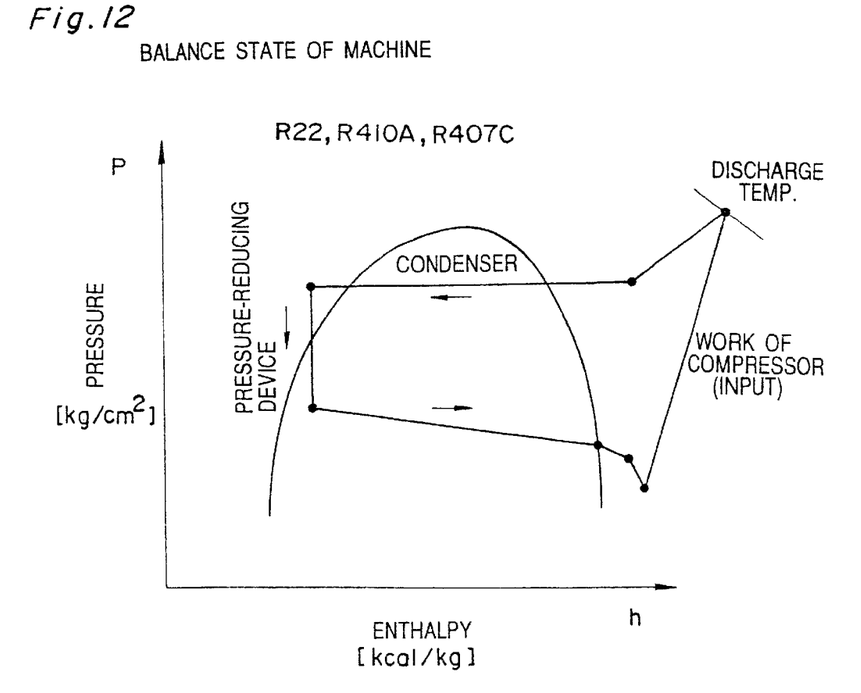
FIG. 12 shows an example of a Mollier diagram in an actual refrigerating device.

Generally, as shown with a P-H (pressure-enthalpy) diagram in FIG. 12, a maximum temperature in a refrigerating cycle is a temperature at the discharge side of the compressor.

Figure 13:
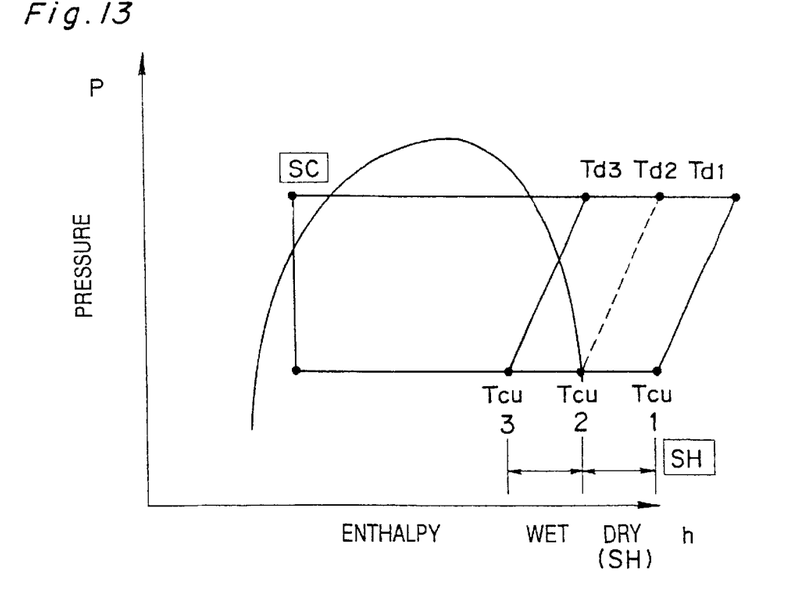
FIG. 13 shows a superheat SH and a sub-cooling degree SC in the Mollier diagram.

The present inventors ascertained in experiments that when the R32 refrigerant is used, the reliability of the compressor is ensured, even though a superheat SH is decreased to increase the wetness of the R32 refrigerant, as shown with a P-H (Td3-Tcu3) line of FIG. 13, as compared with a conventional (Td1-Tcu1) line. As shown in FIG. 13, when the wetness of the R32 refrigerant at the suction side of the compressor is increased, a temperature Td at the discharge side of the compressor decreases from Td1 to Td3. Thus it is possible to avoid reduction in the reliability and the performance.

Let the wetness be x, the refrigerant is in a complete gaseous state when x=1.0, in a liquid state when x=0, and in a fluidized state, or a state of two phases, when x=0.5, 0.6, 0.9, and so on. Supposing that the dryness is y, y=1−x.

Figure 11:
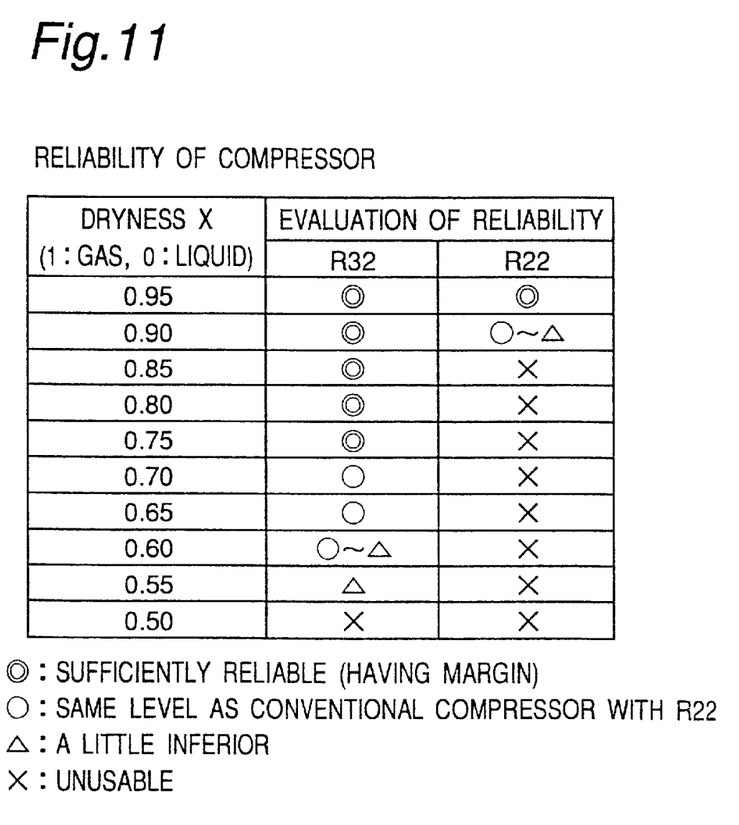
FIG. 11 is a chart showing results of a test for evaluating reliability of a compressor for each dryness of a refrigerant.

As shown in test results of reliability of FIG. 11, in the case where the conventional R22 refrigerant was used, the reliability of the compressor was at an unusable level unless the dryness thereof at the suction side of the compressor was 0.90 or more. In the case of the R32 refrigerant, it was confirmed in experiments that when the dryness thereof at the suction side of the compressor was not less than 0.60, the reliability of the compressor was at a usable level.

Accordingly, in one embodiment, a compressor sucks and compresses an R32 refrigerant having a dryness of 0.65 or more or a mixed refrigerant containing R32 at at least 70 wt % and having a dryness of 0.65 or more.

In the embodiment, the compressor sucks and compresses the R32 refrigerant having the dryness of 0.65 or more. Thus, as is apparent from the test results shown in FIG. 11, it is possible to use the R32 refrigerant without deteriorating the reliability of the compressor and realize energy-saving and a low GWP without reducing the reliability and performance. Also in the case where the compressor sucks the mixed refrigerant containing R32 at 70 wt % or more and having the dryness of 0.65 or more as well, similar effects can be obtained.

In another embodiment, a compressor sucks and compresses an R32 refrigerant having a dryness of 0.70 or more or a mixed refrigerant containing R32 at at least 70 wt % and having a dryness of 0.70 or more.

In the embodiment, since the compressor sucks the R32 refrigerant having the dryness of 0.70 or more, the reliability of the compressor can be further improved. In the case where the compressor sucks the mixed refrigerant containing R32 at at least 70 wt % and having the dryness of 0.70 or more, similar effects can be obtained.

That is, a mixed refrigerant containing R32 at at least 70 wt % provides a pseudo-azeotropy, which allows the R32 refrigerant to have advantages (energy-saving and low GWP) over the R22 refrigerant.

In one embodiment, a compressor sucks and compresses an R32 refrigerant having a dryness of 0.75 or more or a mixed refrigerant containing R32 at at least 70 wt % and having a dryness of 0.75 or more.

In the embodiment, since the compressor sucks the R32 refrigerant having the dryness of 0.75 or more, the reliability of the compressor can be enhanced to a maximum level as is apparent from the test results shown in FIG. 11. In the case where the compressor sucks the mixed refrigerant containing R32 at at least 70 wt % and having the dryness of 0.75 or more as well, similar effects can be obtained.

In one embodiment, the refrigerating device comprises a control means detecting a discharge-pipe temperature of the compressor and controlling the dryness of the refrigerant sucked by the compressor based on the detected discharge-pipe temperature.

In the embodiment, the dryness of the refrigerant sucked by the compressor is controlled based on the discharge-pipe temperature of the compressor. Thus the dryness can be controlled by the simple control means.

In one embodiment, the refrigerating device comprises a control means detecting a superheat and controlling the dryness of the refrigerant sucked by the compressor based on the detected superheat.

In the embodiment, the dryness of the refrigerant sucked by the compressor is controlled based on the superheat. Thus, the dryness of the suction side can be controlled with high precision and the reliability of the compressor can be improved.

In another embodiment, the refrigerating device comprises a control means detecting a subcooling degree and controlling the dryness of the refrigerant sucked by the compressor based on the detected subcooling degree. In the embodiment, the dryness of the refrigerant sucked by the compressor is controlled based on the subcooling degree. Thus the dryness at the suction side can be controlled with high precision and the reliability of the compressor can be improved.

In one embodiment, the refrigerating device comprises a control means controlling a superheating degree at an exit of an evaporator. In the embodiment, the superheating degree at the exit of the evaporator is controlled to increase the wetness at the exit of the evaporator. Thus it is possible to prevent condensation on a fan rotor of the evaporator (in an indoor unit).

In another embodiment, a compressor is of a high-pressure dome type, and in a heating operation at a low temperature (for example, the outdoor temperature is −5° C. or below), the compressor sucks and compresses an R32 refrigerant having a dryness of 0.68 or more or a mixed refrigerant containing R32 at at least 70 wt % and having a dryness of 0.68 or more; and a discharge temperature of the compressor is set to 80–90° C.

In the embodiment, the dryness of the R32 refrigerant at the suction side of the high-pressure dome type compressor is set to 0.68 or more, and the discharge temperature is set to 80–90° C. Thus it is possible to use the R32 refrigerant without deteriorating the reliability of the compressor, which realizes energy-saving and a low GWP and avoids deterioration of the reliability and performance.

In one embodiment, a compressor is of a low-pressure dome type, and in a heating operation at a low temperature (for example, the outdoor temperature is −5° C. or below), the compressor sucks and compresses an R32 refrigerant having a dryness of 0.65 or more or a mixed refrigerant containing R32 at at least 70 wt % and having a dryness of 0.65 or more; and a discharge temperature of the compressor is set to 60–70° C.

In the embodiment, the dryness of the R32 refrigerant at the suction side of the low-pressure dome type compressor is set to 0.65 or more, and the discharge temperature is set to 60–70° C. Thus it is possible to use the R32 refrigerant without deteriorating the reliability of the compressor, which realizes energy-saving and a low GWP and avoids deterioration of the reliability and performance.

BEST MODE FOR CARRYING OUT THE INVENTION

The embodiments of the air conditioner of the present invention will be described in detail below.

First Embodiment

Figure 1:
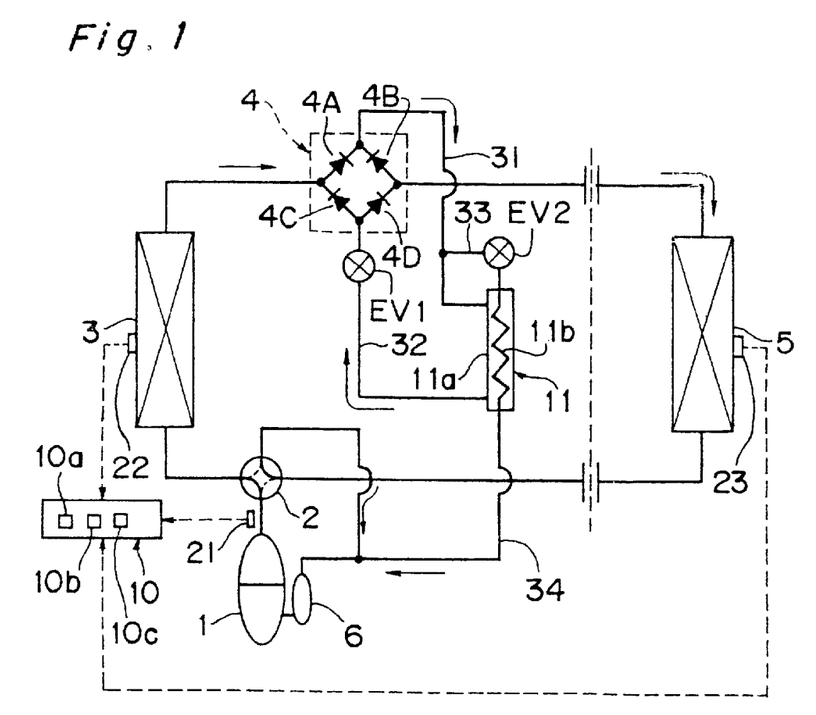
FIG. 1 is a circuit diagram of an air conditioner, of heat pump type, serving as a refrigerating device of a first embodiment of the present invention.

FIG. 1 is a circuit diagram showing a schematic construction of a heat pump type air conditioner as a first embodiment of the refrigerating device of the present invention. Reference numeral 1 denotes a compressor, 2 denotes a four-way selector valve connected to a discharge side of the compressor 1, 3 denotes an outdoor heat exchanger whose one end is connected to the four-way selector valve 2, 4 denotes a bridge circuit serving as a rectifying means, 5 denotes an indoor heat exchanger, 6 denotes an accumulator 6 connected to the indoor heat exchanger 5 through the four-way selector valve 2.

The bridge circuit 4 has check valves 4A, 4B, 4C, and 4D permitting the flow of a refrigerant in only one direction, two input/output ports, one input port, and one output port. The outdoor heat exchanger 3 is connected to one of the input/output ports of the bridge circuit 4. The indoor heat exchanger 5 is connected to the other input/output port of the bridge circuit 4. The check valve 4A is connected to the one input/output port in a direction in which the flow of the refrigerant from the outdoor heat exchanger 3 is permitted. The check valve 4B is connected to the other input/output port in a direction in which the flow of the refrigerant from the indoor heat exchanger 5 is permitted. The check valves 4A and 4B are connected to the output port, with both valves facing each other. The check valve 4C is connected to the input/output port, to which the check valve 4B is connected, in the direction in which the refrigerant to the indoor heat exchanger 5 is permitted to flow. The check valve 4D is connected to the input/output port, to which the check valve 4A is connected, in the direction in which the refrigerant to the outdoor heat exchanger 3 is permitted to flow. The check valves 4C and 4D are connected to the input port, with both valves facing each other.

One end of a pipe 31 is connected to the output port of the bridge circuit 4. The other end of the pipe 31 is connected to one end of an outer tube 11a of a supercooling heat exchanger 11. One end of a pipe 32 is connected to the input port of the bridge circuit 4. The other end of the pipe 32 is connected to the other end of the outer tube 11a of the supercooling heat exchanger 11. A main motor operated valve EV1 serving as a main pressure reduction means is disposed on the pipe 32. The pipe 31 is connected to one end of an inner tube 11a of the supercooling heat exchanger 11 through a by-pass pipe 33 on which a by-pass motor operated valve EV2 serving as a supercooling pressure-reducing means is disposed. The other end of the inner tube 11b of the supercooling heat exchanger 11 is connected to a position between the four-way selector valve 2 and the accumulator 6 through a by-pass pipe 34. As a result, in whichever direction the refrigerant flows between the outdoor heat exchanger 3 and the indoor heat exchanger 5 by a change-over from a cooling operation to a heating operation or vice versa, the bridge circuit 4 allows the refrigerant to flow in only the direction from the supercooling heat exchanger 11 to the main motor operated valve EV1.

A refrigerant circuit is constructed of the compressor 1, the four-way selector valve 2, the outdoor heat exchanger 3, the main motor operated valve EV1, the indoor heat exchanger 5, and the accumulator 6. An R32 refrigerant is used as a working medium.

The air conditioner has a discharge temperature sensor 21 detecting the discharge temperature of the discharge side of the compressor 1, a temperature sensor 22 provided on the outdoor heat exchanger 3 and serving as a condensation temperature sensor or an evaporation temperature sensor for detecting the refrigerant temperature of the outdoor heat exchanger 3, a temperature sensor 23 provided on the indoor heat exchanger 5 and serving as an evaporation temperature sensor or a condensation temperature sensor for detecting the refrigerant temperature of the indoor heat exchanger 5, and a control section 10 controlling the cooling operation and the heating operation upon receipt of signals from each of the temperature sensors 22, 23, and 24. The control section 10 is constructed of a microcomputer, an input/output circuit, and the like, and has a control part 10a controlling the compressor 1, the main motor operated valve EV1, and the by-pass motor operated valve EV2, a discharge temperature determination part 10b determining the discharge temperature detected by the temperature sensor 21, and a target discharge temperature computing part 10c computing a target discharge temperature, based on the discharge temperature, a condensation temperature, and an evaporation temperature detected by the temperature sensors 21–23.

In the case where the air conditioner having the construction performs the cooling operation, the compressor 1 is actuated with the four-way selector valve 2 switched to a position shown with a solid line. As a result, the refrigerant, having a high temperature and a high pressure, discharged from the compressor 1 flows through the four-way selector valve 2, the outdoor heat exchanger 3, the check valve 4A of the bridge circuit 4, the supercooling heat exchanger 11, and to the motor operated valve EV1. The refrigerant pressure-reduced by the motor operated valve EV1 flows through the check valve 4D of the bridge circuit 4, the indoor heat exchanger 5, and to the four-way selector valve 2 and returns to the accumulator 6 from the four-way selector valve 2. At this time, the supercooling heat exchanger 11 supercools the refrigerant flowing into the motor operated valve EV1, and in the indoor heat exchanger 5 functioning as an evaporator, a liquid refrigerant having a low temperature and a low pressure vaporizes and is then exhausted from an exit side thereof.

When the air conditioner performs the heating operation, the compressor 1 is actuated with the four-way selector valve 2 switched to a position shown with a broken line. As a result, the refrigerant, having a high temperature and a high pressure, discharged from the compressor 1 flows through the four-way selector valve 2, the indoor heat exchanger 5, the check valve 4B, the supercooling heat exchanger 11, and the motor operated valve EV1. The refrigerant pressure-reduced by the motor operated valve EV1 flows through the check valve 4C of the bridge circuit 4, the outdoor heat exchanger 3, and to the four-way selector valve 2 and returns to the accumulator 6 from the four-way selector valve 2. At this time, a high-temperature and high-pressure liquid refrigerant upstream of the supercooling heat exchanger 11 is expanded by the by-pass motor operated valve EV2 and becomes a gaseous refrigerant having a low temperature and a low pressure, which flows into the supercooling heat exchanger 11, and supercools the refrigerant flowing into the motor operated valve EV1.

As described above, in the cooling operation and the heating operation, owing to the provision of the bridge circuit 4, the supercooling heat exchanger 11 is disposed at the upstream side of the motor operated valve EV1 so that the supercooling heat exchanger 11 increasingly supercools the refrigerant flowing into the motor operated valve EV1. The operation efficiency can be thereby improved.

The operation of the control section 10 will be described below with reference to the flowchart of FIG. 2. The cooling operation will be only described with reference to FIG. 2. In the heating operation, a change is done between the condenser and the evaporator, and hence between the temperature sensor 22 detecting the condensation temperature Tc and the temperature sensor 23 detecting the evaporation temperature Te, and a processing similar to the cooling operation is executed.

Figure 2:
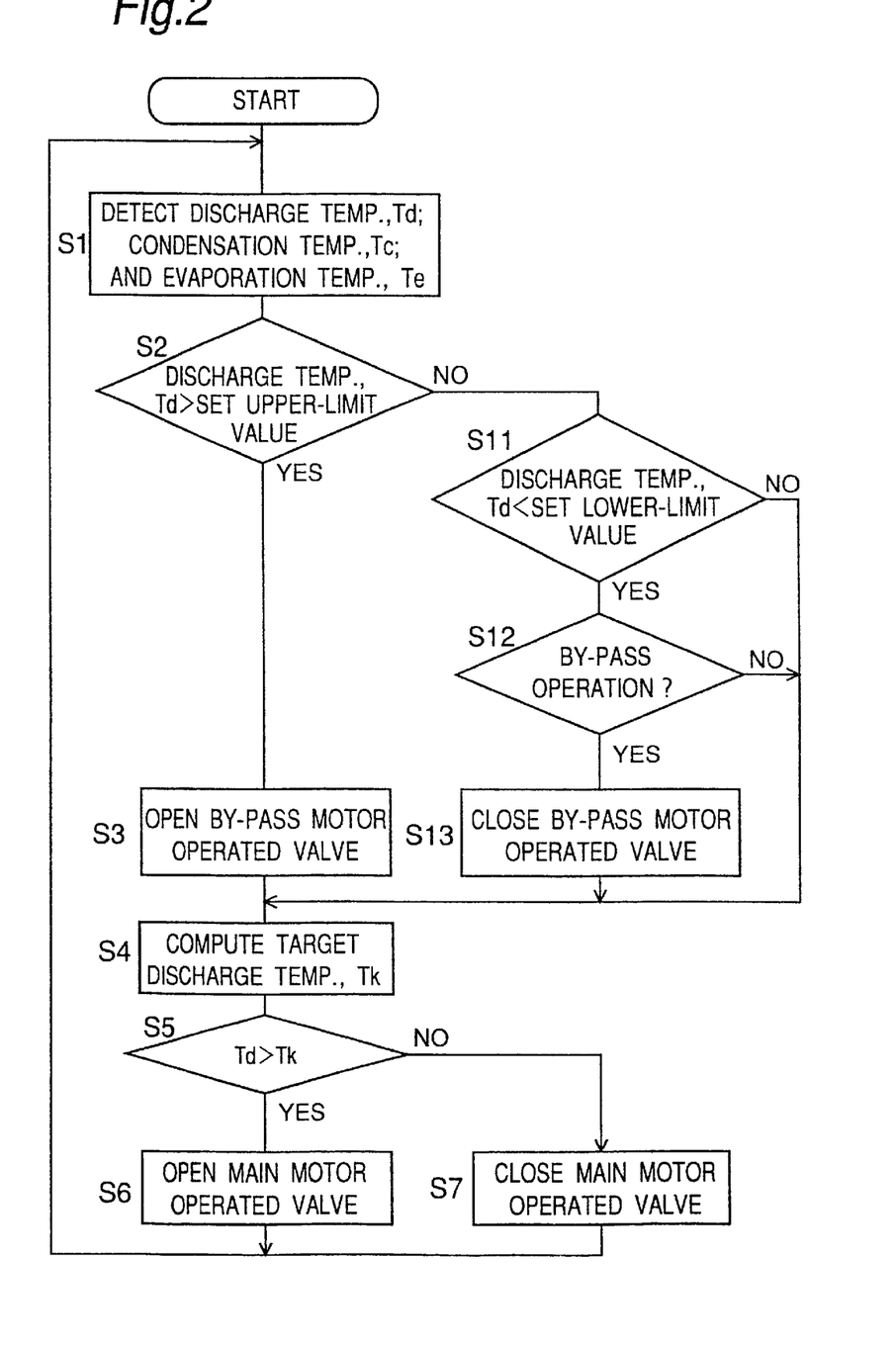
FIG. 2 is a flowchart for describing the operation of a control device of the air conditioner.

With reference to FIG. 2, once the cooling operation starts, a discharge temperature, Td, a condensation temperature, Tc, and an evaporation temperature, Te are detected at step S1. That is, the temperature sensor 21 detects the discharge temperature, Td, at the discharge side of the compressor 1, and the temperature sensor 22 detects the condensation temperature, Tc, of the outdoor heat exchanger 3 serving as the condenser, and the evaporation temperature, Te, of the indoor heat exchanger 5 serving as the evaporator is detected.

Then the program goes to step S2 at which the discharge temperature determination part 10b of the control device 10 determines whether the discharge temperature, Td, is more than a set upper-limit value. If it is determined that the discharge temperature, Td, is more than the set upper-limit value, the program goes to step S3 at which the motor operated by-pass valve EV2 is opened at a predetermined opening. Then the program goes to step S4.

On the other hand, if it is determined that the discharge temperature, Td, is not more than the set upper-limit value, the program goes to step S11 at which the discharge temperature determination part 10b determines whether the discharge temperature, Td, is smaller than a set lower-limit value. If the discharge temperature determination part 10b determines that the discharge temperature, Td, is smaller than the set lower-limit value, the program goes to step S12. On the other hand, if the discharge temperature determination part 10b determines that the discharge temperature, Td, is not smaller than the set lower-limit value, the program goes to step S4.

At step S12, it is determined whether a by-pass operation is being performed. If it is determined that the by-pass operation is being performed, the program goes to step S13 at which the motor operated by-pass valve EV2 is closed by a predetermined value from a current opening. On the other hand, if it is determined that the by-pass operation is not being performed, the program goes to step S4.

Thereafter at step S4, the target discharge temperature computing part 10c computes the target discharge temperature, Tk. The target discharge temperature, Tk, is computed on the basis of the condensation temperature, Tc, and the evaporation temperature, Te, both detected at step S1 and the opening of the by-pass motor operated valve EV2.

Then the program goes to step S5 at which it is determined whether the discharge temperature Td detected at step S1 is more than the target discharge temperature, Tk. If it is determined that the discharge temperature, Td, is more than the target discharge temperature, Tk, the program goes to step S6 at which the main motor operated valve EV1 is opened. On the other hand, if it is determined that the discharge temperature, Td, is not more than the target discharge temperature, Tk, the program goes to step S7 at which the main motor operated valve EV1 is closed.

Figure 3:
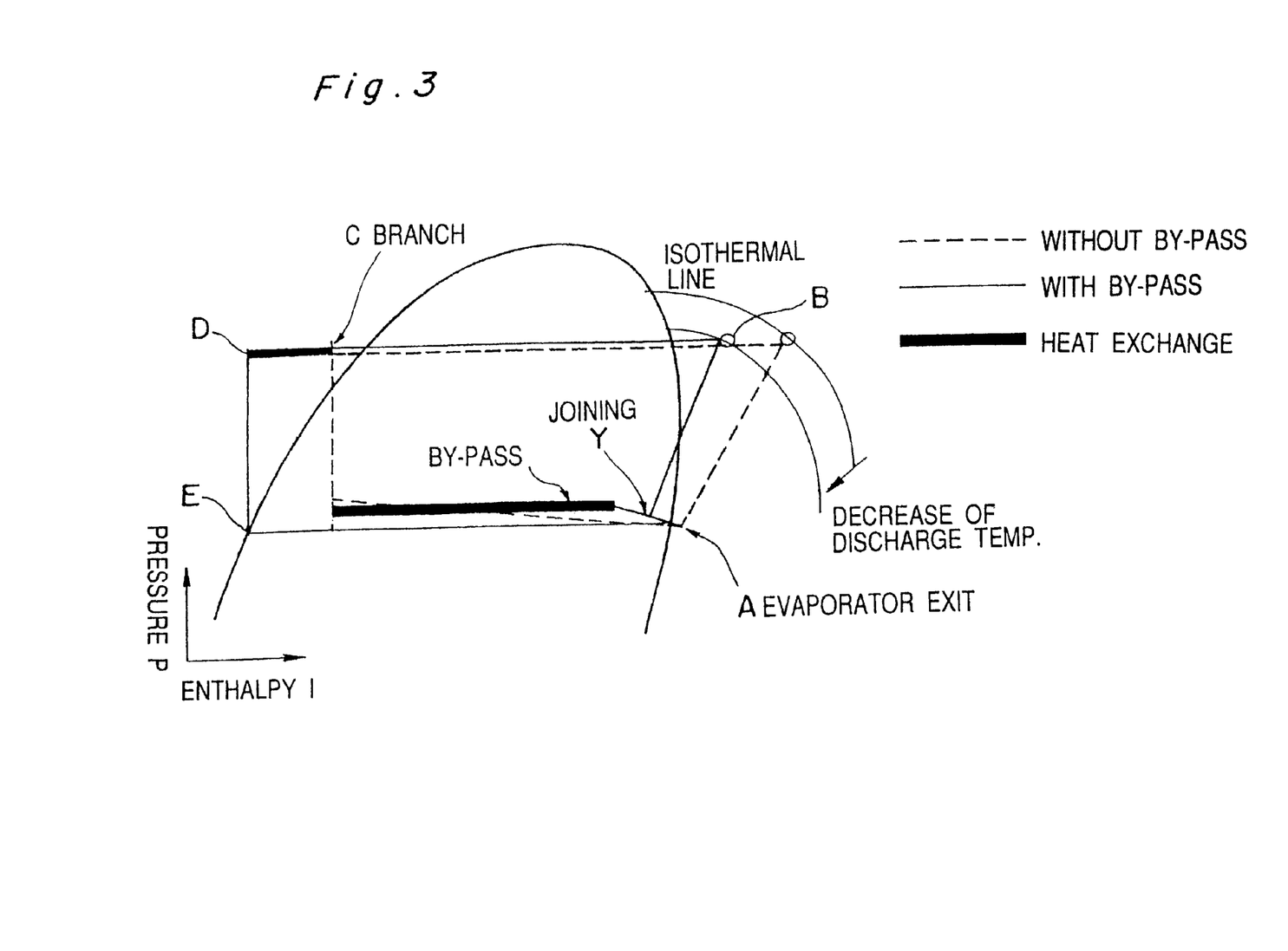
FIG. 3 is a Mollier diagram of the air conditioner.

FIG. 3 shows a Mollier diagram in which the axis of ordinates indicates the pressure P and the axis of abscissas indicates the enthalpy 1. Referring to FIG. 3, for comparison, the case where the supercooling heat exchanger 11 is not provided (a by-pass is not provided) and the case where the supercooling heat exchanger is provided (a by-pass is provided) will be described below.

In the case where the supercooling heat exchanger 11 is not provided, a normal cycle changes as shown with a broken line in FIG. 3. On the other hand, in the case where the supercooling heat exchanger 11 is provided, the refrigerant cycle changes as shown with a solid line (and a thicker solid line) of FIG. 3. That is, the refrigerant in a state A (exit of evaporator) at the input side of the compressor 1 is changed into a high-pressure state B by the compressor 1, and owing to condensation of the refrigerant in the outdoor heat exchanger 3, the state B is changed into a state C (branch) in which the refrigerant has a small enthalpy. The supercooling heat exchanger 11 supercools the refrigerant at the exit side of the outdoor heat exchanger 3 to change the state of the refrigerant from C to D.

Then the refrigerant supercooled by the supercooling heat exchanger 11 is changed into a pressure reduced state E owing to expansion thereof at the main motor operated valve EV1. The refrigerant in the state E is changed into the state A in which the enthalpy has become high owing to heat absorption from outside air, with the pressure being approximately constant due to the evaporation at the indoor heat exchanger 5. Then, the exit side of the indoor heat exchanger 5 and the exit side of the by-pass pipe of the supercooling heat exchanger 11 are joined with each other to change the state from A to Y. As a result, the discharge temperature of the compressor 1 decreases.

As described above, the discharge temperature Td detected by the discharge temperature sensor 21 is discriminated or determined by the discharge temperature determination part 10b. Then, based on the result of the determination, the supercooling motor operated valve EV2 is controlled to adjust the amount of the refrigerant flowing through the by-pass pipes 33 and 34 to a large amount or a small amount, according as the discharge temperature is high or low. Thereby when the discharge temperature is high, the discharge temperature is decreased by increasing the amount of the refrigerant flowing through the by-pass pipes. Accordingly, even if the R32 refrigerant higher in the discharge temperature than the HCFC refrigerants is used, it is possible to optimize the discharge temperature of the compressor 1 without deteriorating the efficiency and improve the COP and the reliability.

In accordance with the result of comparison, made by the discharge temperature determination part 10b, between the discharge temperature and the set upper-limit value as well as the set lower-limit value, the control part 10a controls the supercooling motor operated valve EV2 to accurately adjust the amount of the refrigerant flowing through the by-pass pipes 33 and 34, whereby an optimum control of the discharge temperature can be accomplished.

The target discharge temperature computing part 10c computes the target discharge temperature, Tk, suitable to the operation conditions or situation (cooling operation/heating operation, operation frequency of the compressor, etc.), based on the condensation temperature, Tc, the evaporation temperature, Te, and the opening of the supercooling motor operated valve EV2. Then, based on the obtained target discharge temperature Tk, the control part 10a controls the opening of the main motor operated valve EV1. The control of the main motor operated valve combined with the control of the supercooling motor operated valve EV2 makes it possible to accurately control the discharge temperature of the compressor 1.

Second Embodiment

Figure 4:
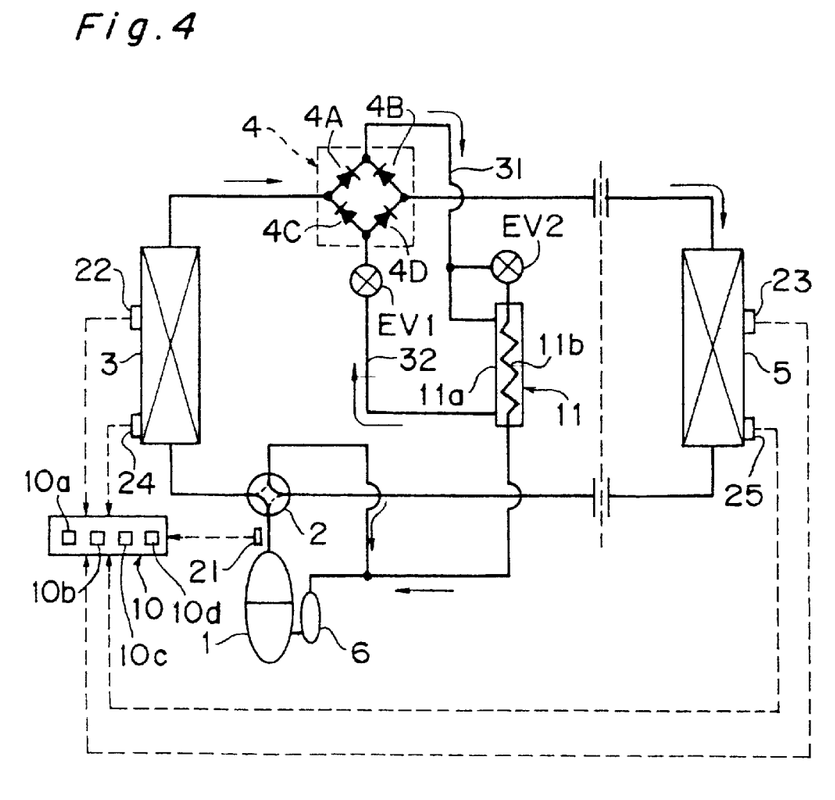
FIG. 4 is a circuit diagram of an air conditioner of a second embodiment of the present invention.

FIG. 4 is a circuit diagram showing a schematic construction of a heat-pump type air conditioner serving as a refrigerating device of a second embodiment of the present invention. Except for temperature sensors 24, 25 and the operation of the control device 10, the air conditioner of the second embodiment has the same construction as that of the air conditioner of the first embodiment. Thus the same constituent parts of the air conditioner of the second embodiment as those of the air conditioner of the first embodiment are denoted by the same reference numerals and description thereof is omitted herein.

As shown in FIG. 4, the air conditioner has a temperature sensor 24 disposed on the outdoor heat exchanger 3 and serving as an evaporator-exit temperature sensor and a temperature sensor 25 disposed on the indoor heat exchanger 5 and serving as an evaporator-exit temperature sensor. The temperature sensors 24 and 25 are installed on the outdoor heat exchanger 3 and the indoor heat exchanger 5 respectively in such a way that the temperature sensors 24 and 25 are positioned within ⅓ of the entire length of the heat exchangers from the gas side thereof.

The control section 10 is constructed of a microcomputer, an input/output circuit, etc. and has a control part 10a controlling the compressor 1, the main motor operated valve EV1, and the by-pass motor operated valve EV2, a discharge temperature determination part 10b comparing a discharge temperature detected by the temperature sensor 21 with a set upper-limit value and a set lower-limit value, a target discharge temperature computing part 10c computing a target discharge temperature, based on a discharge temperature, a condensation temperature, and an evaporation temperature detected by the temperature sensors 21–23, and a target evaporator-exit temperature computing part 10d computing a target evaporator-exit temperature, based on the evaporation temperature detected by the temperature sensor 22 or 23.

Figure 5:
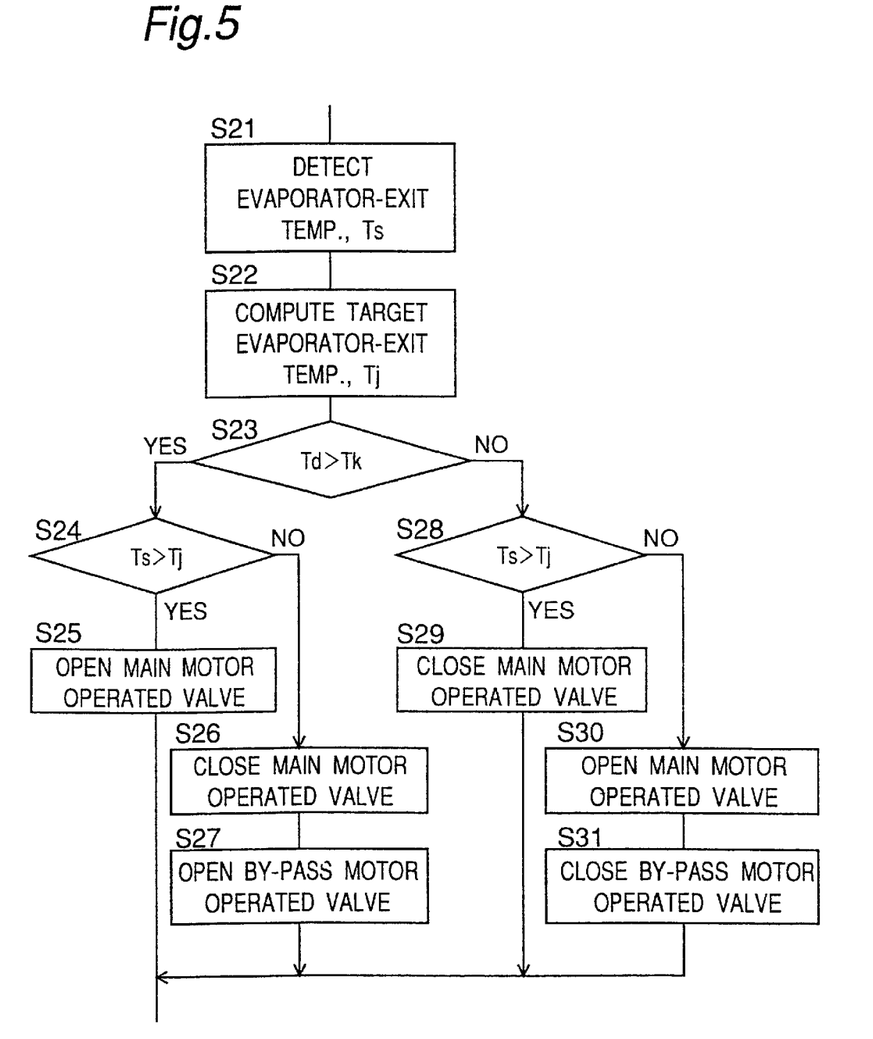
FIG. 5 is a flowchart for describing the operation of a control device of the air conditioner.

In the air conditioner having the construction, the operation of the control section 10 is similar to that of the air conditioner in steps S1–S4 and S11–S13 of the flowchart of FIG. 2 of the air conditioner of the first embodiment, but different from the air conditioner of the first embodiment in only steps S5–S7. FIG. 5 shows a flowchart of the operation only in steps different from the air conditioner of the first embodiment.

After the target discharge temperature, Tk, is computed at step S4 of FIG. 2, an evaporator-exit temperature, Ts, is detected at step S21 of FIG. 5. In this case, in the cooling operation, the temperature sensor 25 detects the temperature of the refrigerant at the exit side of the indoor heat exchanger 5 serving as the evaporator. In the heating operation, the temperature sensor 24 detects the temperature of the refrigerant at the exit side of the outdoor heat exchanger 3 serving as the evaporator.

Thereafter at step S22, the target evaporator-exit temperature computing part 10d computes a target evaporator-exit temperature, Tj. The target evaporator-exit temperature, Tj, is found by using an equation shown below:

$$Tj = \text{evaporation temperature } Te + A$$

where A is determined by a table prepared in accordance with the operation conditions for cooling/heating operation and the operation frequency of the compressor.

Then at step S23, it is determined whether the discharge temperature, Td, is more than the target discharge temperature, Tk. If it is determined that the discharge temperature, Td, is more than the target discharge temperature, Tk, the program goes to step S24. On the other hand, if it is determined that the discharge temperature, Td, is not more than the target discharge temperature Tk, the program goes to step S28.

Thereafter at step S24, it is determined whether the evaporator-exit temperature, Ts, is more than the target evaporator-exit temperature, Tj. If it is determined that the evaporator-exit temperature, Ts, is more than the target evaporator-exit temperature, Tj, the program goes to step S25 at which according to an instruction of the control part 10a, the main motor operated valve EV1 is opened further by a predetermined amount from a current opening. On the other hand, if it is determined at step 24 that the evaporator-exit temperature, Ts, is not more than the target evaporator-exit temperature, Tj, the program goes to step S26 at which according to an instruction of the control part 10a, the main motor operated valve EV1 is closed by a given amount from the current opening, and at step S27, the motor operated by-pass valve EV2 is opened further by a given amount from a current opening. Thereafter the program returns to step S1 of FIG. 2.

It is determined at step S28 whether the evaporator-exit temperature, Ts, is more than the target evaporator-exit temperature, Tj. If it is determined that the evaporator-exit temperature Ts is not more than the target evaporator-exit temperature, Tj, the program goes to step S29 at which according to an instruction of the control part 10a, the main motor operated valve EV1 is closed by a given amount from the current opening. On the other hand, if it is determined at step S28 that the evaporator-exit temperature, Ts, exceeds the target evaporator-exit temperature, Tj, the program goes to step S30 at which under the control of the control part 10a, the main motor operated valve EV1 is opened further from the current opening by a given amount and at step S31, the motor operated by-pass valve EV2 is closed by a given amount from the current opening. Thereafter the program returns to step S1 of FIG. 2.

As is obvious from the above, the air conditioner has advantages similar to the advantages of the air conditioner of the first embodiment. Further, due to utilization of evaporator-exit temperature for the control of the discharge temperature of the compressor 1, the air conditioner has improved controllability of the amount of the refrigerant flowing through the by-pass pipe, namely, improved controllability of the supercooling degree.

Although the air conditioner has been described as the refrigerating device in the first and second embodiments, the present invention is applicable to other types of refrigerating devices.

Although the air conditioner using the R32 refrigerant has been described in the first and second embodiments, the refrigerant used for the refrigerating device is not limited to the R32 refrigerant, but a mixed refrigerant containing R32 at at least 70 wt % may be used therefor. For example, it is possible to use a mixed refrigerant of the R32 refrigerant and $CO_2$, the content of R32 being from 70 wt % to 90 wt % inclusive, a mixed refrigerant of R32 and R22, the content of R32 being from 70 wt % to 90 wt % inclusive, or the like.

Figure 6:
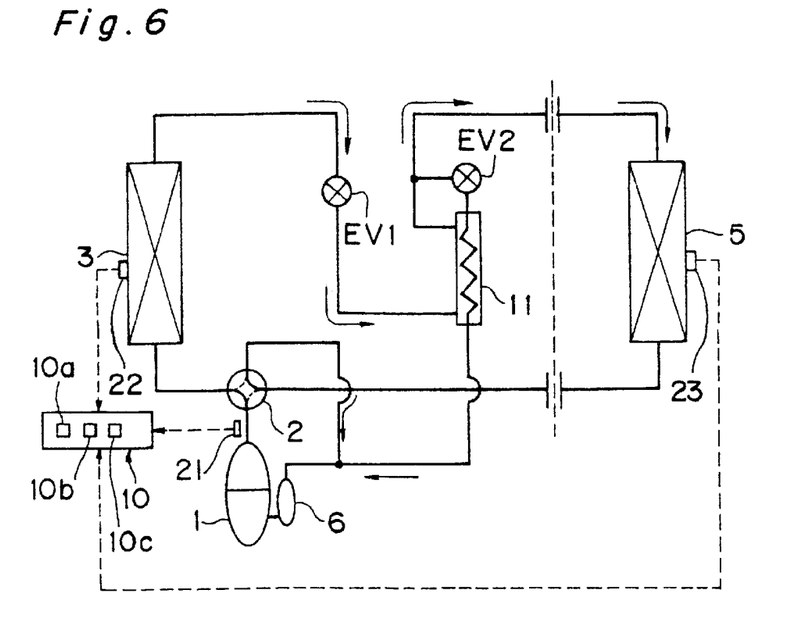
FIG. 6 is a circuit diagram of an air conditioner not having a bridge circuit.
Figure 7:
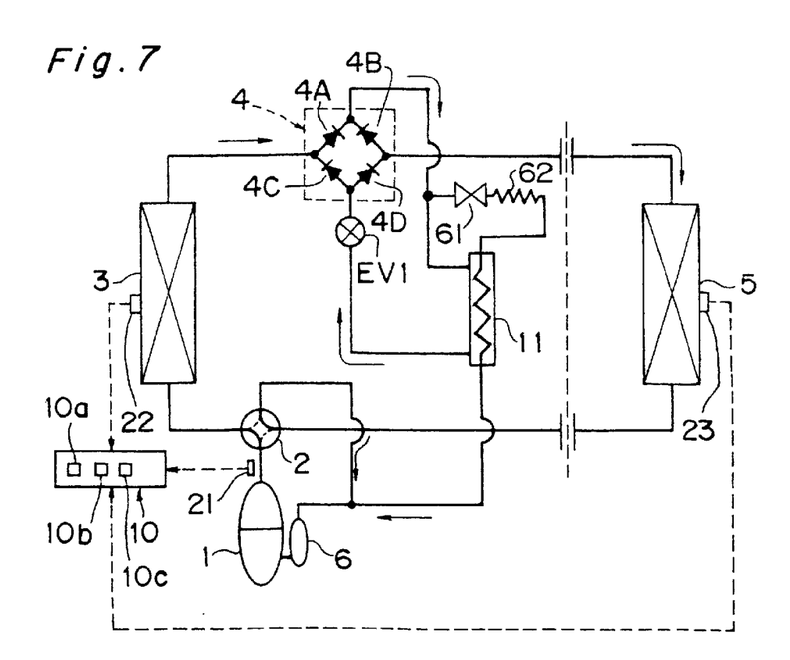
FIG. 7 is a circuit diagram of an air conditioner using a solenoid operated valve and a capillary as a supercooling pressure-reducing means.
Figure 8:
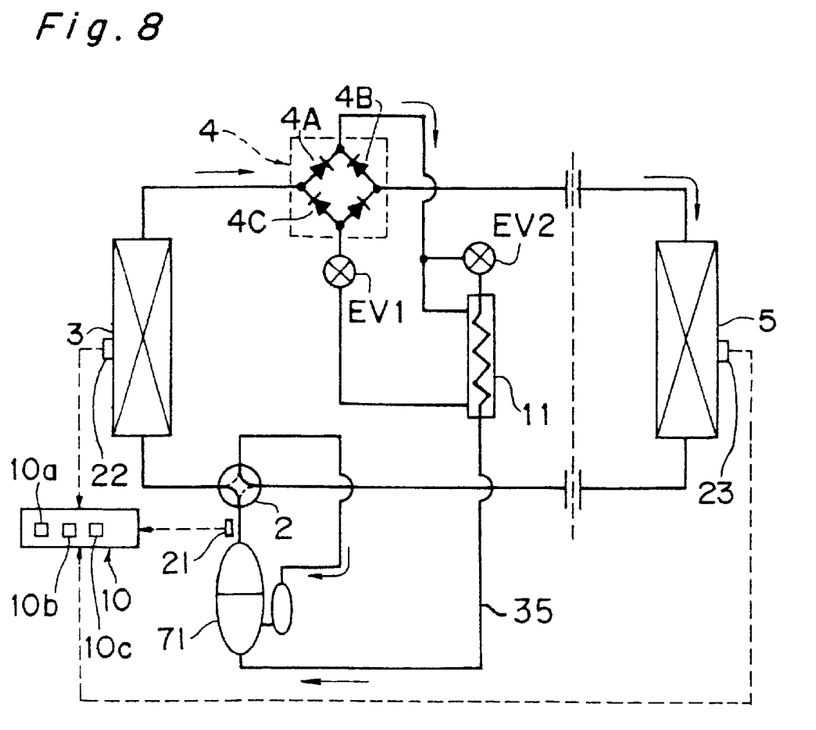
FIG. 8 is a circuit diagram of an air conditioner using an injection circuit.

In the first and second embodiment, the air conditioners having the refrigerant circuit and the supercooling circuit shown in FIGS. 1 and 4 have been described as the refrigerating device. However the construction of the refrigerating device is not limited to the air conditioners shown in FIGS. 1 and 4. For example, a refrigerating device having a construction as shown in FIG. 6 in which the bridge circuit is removed from FIG. 1 may be used. In this case, the supercooling motor operated valve EV2 is opened in only the heating operation to by-pass the refrigerant. Also, the refrigerating device may have a construction as shown in FIG. 7 in which a solenoid operated valve 61 and a capillary 62 are used as the supercooling pressure-reducing means instead of the supercooling motor operated valve of FIG. 1. Further as shown in FIG. 8, the refrigerating device may have an injection circuit for injecting a gas refrigerant from the supercooling heat exchanger 11 into an intermediate-pressure portion of a compressor 71 through a by-pass pipe 35. In FIGS. 6 through 8, the same constituent parts as those shown in FIG. 1 are denoted by the reference numerals.

Third Embodiment

Figure 9:
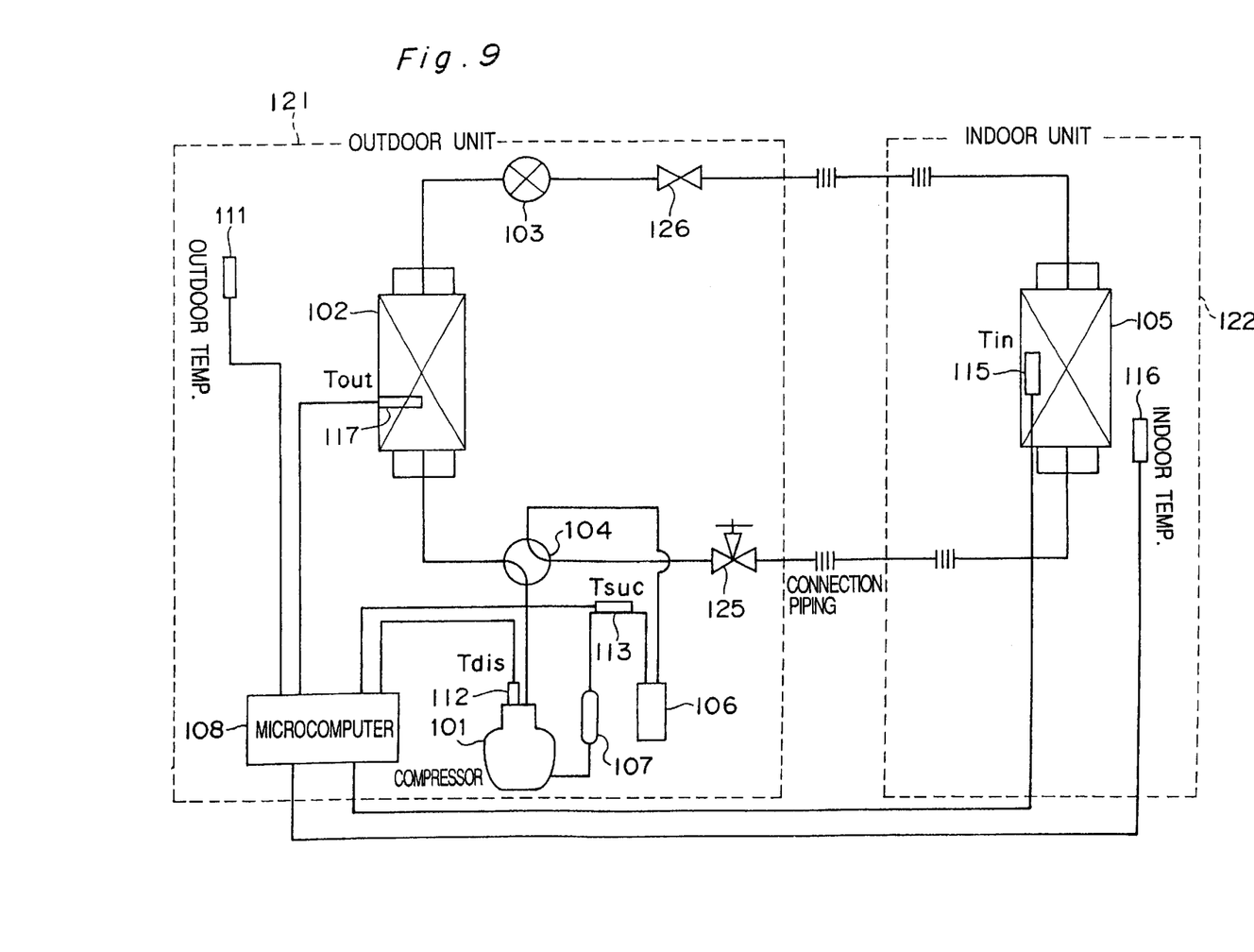
FIG. 9 is a refrigerant circuit of an air conditioner which is an embodiment of the refrigerating device of the present invention.

FIG. 9 shows a refrigerant circuit of an air conditioner being a third embodiment of the refrigerating device of the present invention. In the third embodiment, the R32 refrigerant is used. The third embodiment has a refrigerant circuit having a compressor 101, a four-way selector valve 104, an outdoor heat exchanger 102, an expansion valve 103, a valve 126, an indoor heat exchanger 105, a valve 125, a gas-liquid separator 106, and an accumulator 107 sequentially connected. An outdoor unit 121 having the outdoor heat exchanger 102 is connected to an indoor unit 122 through a connection piping.

The third embodiment has a control section 108 provided by a microcomputer. The control section 108 is connected to a temperature sensor 113 mounted on a suction-side pipe of the compressor 101, a temperature sensor 112 mounted on a discharge-side pipe of the compressor, a temperature sensor 117 mounted on the outdoor heat exchanger 102, a temperature sensor 115 mounted on the indoor heat exchanger 105, a temperature sensor 111 detecting an outdoor temperature, and a temperature sensor 116 detecting an indoor temperature.

Figure 10:
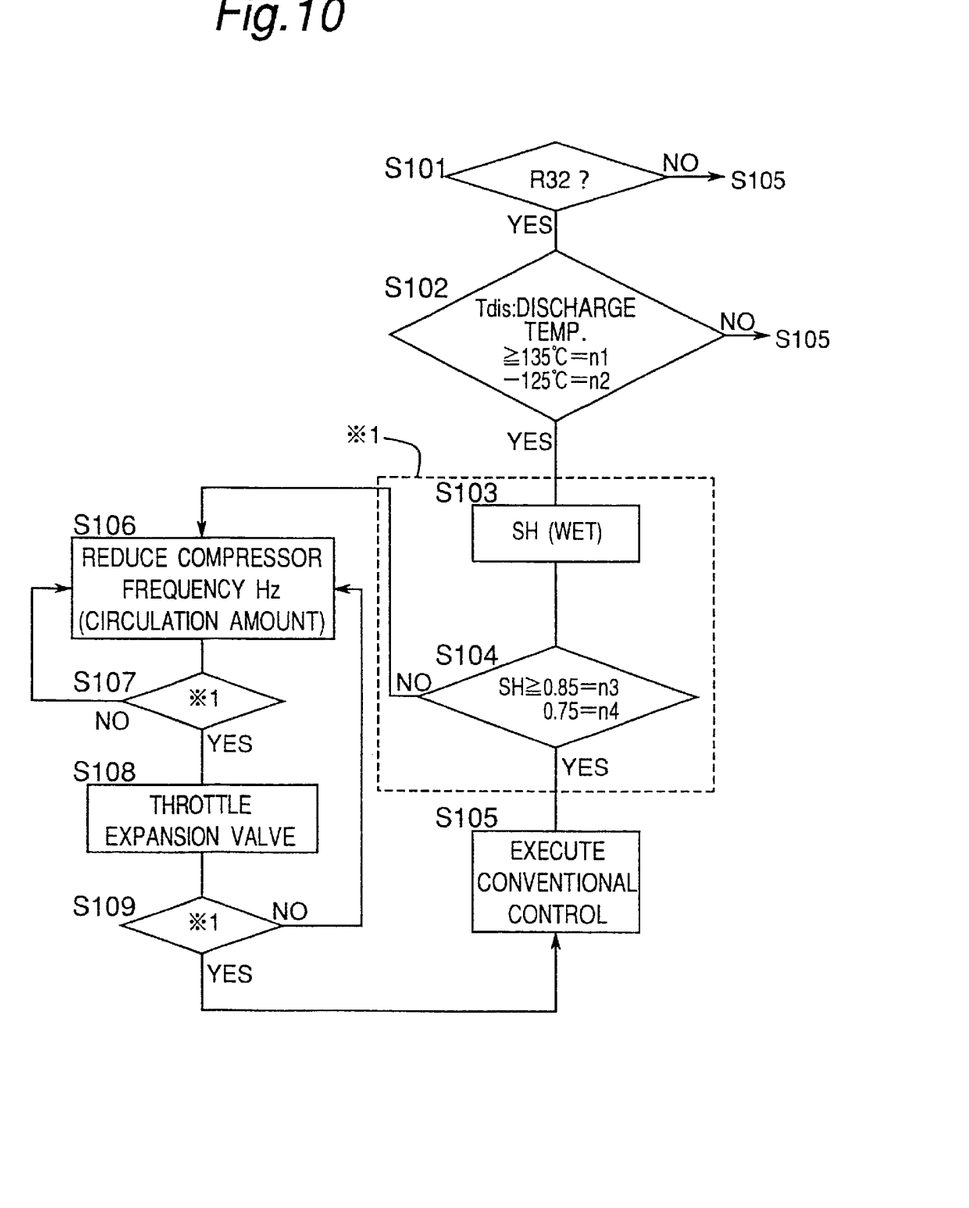
FIG. 10 is a flowchart for describing the operation of a control device of the embodiment.

The operation of the control section 108 of the third embodiment will be described below with reference to FIG. 10. Initially at step S101, it is determined at step S101 whether the air conditioner uses the R32 refrigerant. If it is determined that the air conditioner uses the R32 refrigerant, the program goes to step S102. Whether the air conditioner uses the R32 refrigerant may be determined on the basis of information inputted in advance. If it is determined that the air conditioner does not use the R32 refrigerant, the program goes to step S105 at which a conventional control is continuously executed. The "conventional control" means a control of the compressor 101 and the expansion valve 103 based on a discharge-pipe temperature, Tdis, obtained from the temperature sensor 112.

At step S102, it is determined whether the discharge-pipe temperature, Tdis, is equal to or higher than a predetermined value within the range of 135° C.–125° C. If it is determined that the discharge-pipe temperature, Tdis, is equal to or higher than the predetermined value, the program goes to step S103. On the other hand, if it is determined that the discharge-pipe temperature, Tdis, is less than the predetermined value, the program goes to step S105.

At step S103, a superheat SH (see FIG. 13) is detected whereby the wetness of the refrigerant at the suction side of the compressor 101 is detected. That is, the superheat SH which is the difference between a temperature, Tsuc, of the compressor 101 at its suction side obtained from the temperature sensor 113 and the temperature of the evaporator obtained from the temperature sensor 117 or 115 (temperature, Tin, of the indoor heat exchanger 105 in cooling operation) is detected. Then an operation of increasing the number of rotations of the compressor 101 and/or an operation of opening the expansion valve 103 is performed to decrease the superheat SH to thereby increase the wetness. Thereby the refrigerant temperature of the compressor at its discharge side is decreased to avoid deterioration of the reliability and the performance.

Thereafter the program goes to step S104 at which it is determined whether the superheat SH is equal to or more than a predetermined value within the range of 0.85–0.75. If it is determined that the superheat SH is equal to or more than the predetermined value, the program goes to step S105 at which the conventional control is continuously executed.

On the other hand, if it is determined that the superheat SH is less than the predetermined value (overwet) within the range of 0.85–0.75, the program goes to step S106 at which the number of rotations of the compressor 101 is decreased so that the circulation amount of the refrigerant is decreased. By thus doing, the superheat SH is increased by a predetermined value and hence the wetness is decreased accordingly, whereby the dryness of the refrigerant is kept at a proper value (0.85–0.75).

Thereafter the program goes to step S107 at which the processing of steps S103 and S104 is executed to decrease the superheat by a predetermined value, and an operation of decreasing the discharge-pipe temperature is performed. If the superheat is less than the proper value (0.85–0.75), the program returns to step S106 at which the superheat is increased. On the other hand, if it is determined at step S107 that the superheat is more than the proper value (0.85–0.75), the program returns to step S108 at which the expansion valve 103 is throttled to decrease the superheat and hence increase the wetness to thereby decrease the discharge-pipe temperature, Tdis. Thereafter the program goes to step S109.

At step S109, the operation of steps S103 and S104 is performed. That is, the discharge-pipe temperature is decreased by performing the operation of decreasing the superheat SH. Then, the program goes to step S105 if the superheat SH is equal to or larger than the predetermined value (in the range of 0.85–0.75) at which sufficient reliability is obtained. If the superheat SH has not reached the predetermined value, the program goes to step S106 at which the superheat-increasing operation is performed again.

As described above, in the third embodiment, when the discharge-pipe temperature becomes the predetermined value or more, the superheat SH is decreased to increase the wetness and decrease the discharge-pipe temperature (steps S102, S103). Then if it is determined that the superheat SH is short, to increase the dryness, the number of rotations of the compressor 101 is decreased to increase the superheat SH to a proper value (0.85–0.75) at which the reliability of the compressor 101 is sufficiently secured.

Owing to the control, the discharge temperature can be decreased by decreasing the dryness (superheat) of the R32 refrigerant, sucked by the compressor 101, to fall within the range where the reliability of the compressor 101 is sufficiently secured. Thus energy-saving and a low GWP is realized while avoiding reduction in the reliability (reduction in lubricity of compressor, wear, and the like) and in the performance (low temperature performance in the heating operation).

In the third embodiment, although the proper value of the dryness (superheat) is set to the range of 0.85–0.75, the proper value thereof may be set to the range not less than 0.65, 0.70 or 0.75. In the third embodiment, although the compressor 101 and the expansion valve 103 are controlled based on the superheat, the compressor and the expansion valve may be controlled based on the discharge-pipe temperature of the compressor or a sub-cooling degree (SC). Although the refrigerant consisting solely of R32 is used in the third embodiment, similar effects can be obtained even in the case where a mixed refrigerant containing R32 at at least 70 wt % is used.

That is, a mixed refrigerant containing R32 at at least 70 wt % provides a pseudo-azeotropy, which allows the R32 refrigerant to display its advantages (energy-saving and low GWP) over the R22 refrigerant.

Compressors include a high-pressure dome type compressors and low-pressure dome type compressors. The "high-pressure dome type" is a type of a compressor wherein a compressor motor is placed in a high-pressure atmosphere of a discharge gas or the like, whereas the "low-pressure dome type" is a type of a compressor wherein a compressor motor is placed in a low-pressure atmosphere of a low-pressure gas or a liquid. The discharge temperature of the low-pressure dome type compressor is lower by 15° C.–20° C. than that of the high-pressure dome type compressor. Accordingly in the case where the low-pressure dome type compressor is adopted in the air conditioner adopting the R32 refrigerant, the dryness of the refrigerant sucked by the compressor is set to 0.65–0.95 to control the discharge temperature of the compressor to 60° C.–70° C. By thus doing, it is possible to realize an energy-saving, low-GWP and low-cost air conditioner that avoids deterioration in the reliability and performance of the compressor.

In the third embodiment, the control part 108 may be so constructed as to control the superheating degree of the refrigerant at the exit of the indoor heat exchanger 105 serving as the evaporator to thereby increase the wetness of the refrigerant at the exit of the indoor heat exchanger 105 and prevent condensation on a fan rotor of the indoor heat exchanger 105. The condensation prevention control may be applied to a case using a mixed refrigerant containing 50 wt % R32 and 50 wt % R125 as well as a case using R407C (R32 /R125/R134a: 23/25/52 wt %).

What is claimed is:

1. A refrigerating device comprising:
    a refrigerant circuit having a compressor (1), a condenser (3, 5), a main pressure-reducing means (EV1), and an evaporator (5, 3) connected in a loop;
    a supercooling heat exchanger (11) disposed between the condenser (3, 5) and the main pressure-reducing means (EV1);
    a by-pass pipe (33, 34) by which a gas side of the refrigerant circuit and a liquid side thereof are connected through the supercooling heat exchanger (11); and
    a supercooling pressure-reducing means disposed at the by-pass pipe (33, 34) upstream of the supercooling heat exchanger (11), wherein:
        the refrigerating device uses an R32 refrigerant or a mixed refrigerant containing the R32 refrigerant at at least 70 wt %; and
        the refrigerating device further comprises:
            a discharge temperature sensor (21) detecting a discharge temperature of the compressor (1);
            a discharge temperature determination part (10b) determining the discharge temperature detected by the discharge temperature sensor (21); and
            a control part (10a) controlling the supercooling pressure-reducing means, based on a result of determination made by the discharge temperature determination part (10b), to control an amount of the refrigerant flowing through the by-pass pipe.

2. A refrigerating device according to claim 1, wherein when the discharge temperature determination part (10b) determines that the discharge temperature exceeds a set upper-limit value, the control part (10a) controls the supercooling pressure-reducing means to increase the amount of the refrigerant flowing through the by-pass pipe (33, 34), and to decrease the amount of the refrigerant flowing through the by-pass pipe (33, 34) when the discharge temperature determination part (10b) determines that the discharge temperature is smaller than a set lower-limit value.

3. A refrigerating device according to claim 1, wherein the supercooling pressure-reducing means comprises a supercooling motor operated valve (EV2), and the refrigerating device further comprises:
    a condensation temperature sensor (22, 23) detecting a condensation temperature of the condenser (3, 5);
    an evaporation temperature sensor (23, 22) detecting an evaporation temperature of the evaporator (5, 3);
    a target discharge temperature computing part (10c) computing a target discharge temperature, based on the condensation temperature detected by the condensation temperature sensor (22, 23), the evaporation temperature detected by the evaporation temperature sensor (23, 22), and an opening of the supercooling motor operated valve (EV2),
    the control part (10a) controls the main pressure-reducing means (EV1) to allow the discharge temperature of the compressor (1) to attain to the target discharge temperature.

4. A refrigerating device according to claim 3, further comprising an evaporator-exit temperature sensor (24, 25) detecting a temperature at an exit of the evaporator (3, 5),
    wherein the control part (10a) controls the main pressure-reducing means (EV1) and the supercooling motor operated valve (EV2), based on the target discharge temperature computed by the target discharge temperature computing part (10c) and the temperature at the exit of the evaporator detected by the evaporator-exit temperature sensor (24, 25).

5. A refrigerating device of which a compressor (101) sucks and compresses an R32 refrigerant having a dryness of 0.65 or more or a mixed refrigerant containing R32 at at least 70 wt % and having a dryness of 0.65 or more.

6. A refrigerating device according to claim 5, comprising a control means (108) detecting a discharge-pipe temperature of the compressor (101) and controlling the dryness of the refrigerant sucked by the compressor based on the detected discharge-pipe temperature.

7. A refrigerating device according to claim 5, comprising a control means (108) detecting a superheat (SH) and controlling the dryness of the refrigerant sucked by the compressor-based on the detected superheat.

8. A refrigerating device according to claim 5, comprising a control means (108) detecting a subcooling degree (SC) and controlling the dryness of the refrigerant sucked by the compressor based on the detected subcooling degree.

9. A refrigerating device according to claim 5, comprising a control means (108) controlling a superheating degree at an exit of an evaporator (105, 102).

10. A refrigerating device of which a compressor (101) sucks and compresses an R32 refrigerant having a dryness of 0.70 or more or a mixed refrigerant containing R32 at at least 70 wt % and having a dryness of 0.70 or more.

11. A refrigerating device of which a compressor (101) sucks and compresses an R32 refrigerant having a dryness of 0.75 or more or a mixed refrigerant containing R32 at at least 70 wt % and having a dryness of 0.75 or more.

12. A refrigerating device of which a compressor is of a high-pressure dome type, and wherein
    the compressor sucks and compresses an R32 refrigerant having a dryness of 0.68 or more or a mixed refrigerant containing R32 at at least 70 wt % and having a dryness of 0.68 or more; and
    a discharge temperature of the compressor is set to 80–90° C.

13. A refrigerating device of which a compressor is of a low-pressure dome type, and wherein
    the compressor sucks and compresses an R32 refrigerant having a dryness of 0.65 or more or a mixed refrigerant containing R32 at at least 70 wt % and having a dryness of 0.65 or more; and
    a discharge temperature of the compressor is set to 60–70° C.

* * * * *